(12) United States Patent
Ragan

(10) Patent No.: US 7,640,041 B2
(45) Date of Patent: Dec. 29, 2009

(54) MULTIPLE FUNCTION HANDHELD DEVICE

(75) Inventor: Thomas Glen Ragan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 588 days.

(21) Appl. No.: 11/290,329

(22) Filed: Nov. 30, 2005

(65) Prior Publication Data

US 2007/0123299 A1 May 31, 2007

(51) Int. Cl.
*H04B 1/38* (2006.01)

(52) U.S. Cl. .............. 455/572; 455/556.1; 455/550.1; 455/344; 455/552.1; 360/137

(58) Field of Classification Search ........ 455/572, 455/556.1, 550.1, 344, 552.1; 360/137
See application file for complete search history.

(56) References Cited

U.S. PATENT DOCUMENTS

| | | | |
|---|---|---|---|
| 6,996,416 B2 * | 2/2006 | Ito | 455/556.1 |
| 7,142,900 B1 * | 11/2006 | Straub | 455/701 |
| 7,330,874 B2 * | 2/2008 | Nakamura et al. | 709/203 |
| 7,421,291 B2 * | 9/2008 | Karaoguz et al. | 455/574 |
| 2002/0016189 A1 | 2/2002 | Sheynblat et al. | |
| 2002/0128000 A1 * | 9/2002 | do Nascimento, Jr. | 455/414 |
| 2002/0147037 A1 | 10/2002 | Kwon | |
| 2003/0050092 A1 | 3/2003 | Yun | |
| 2005/0213249 A1 * | 9/2005 | Shimomura | 360/137 |
| 2005/0250531 A1 | 11/2005 | Takebe et al. | |
| 2006/0141938 A1 * | 6/2006 | Rush | 455/67.11 |
| 2007/0024603 A1 | 2/2007 | Li | |

\* cited by examiner

*Primary Examiner*—Sanh D Phu
(74) *Attorney, Agent, or Firm*—Ingrassia, Fisher & Lorenz, PC

(57) ABSTRACT

A method for enabling at least a portion of a multiple function handheld device begins by enabling at least a portion of a digital audio functionality in response to a first mode selection. The method continues by disabling wireless communication functionality in response to the first mode selection.

20 Claims, 9 Drawing Sheets

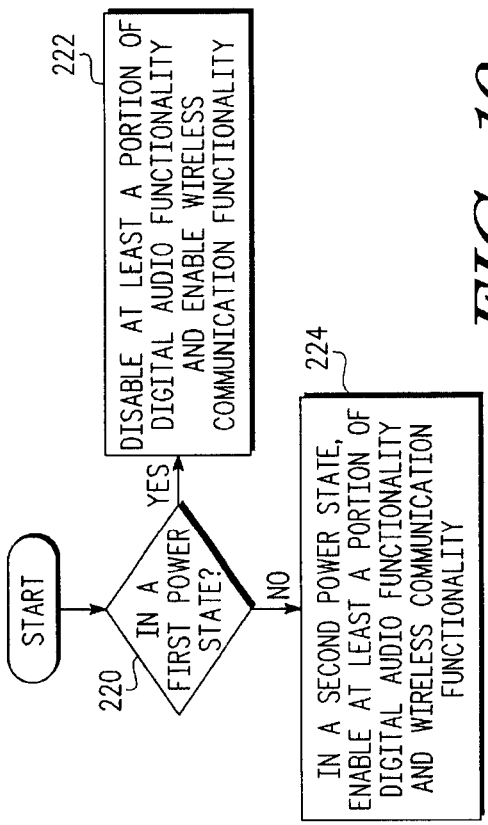
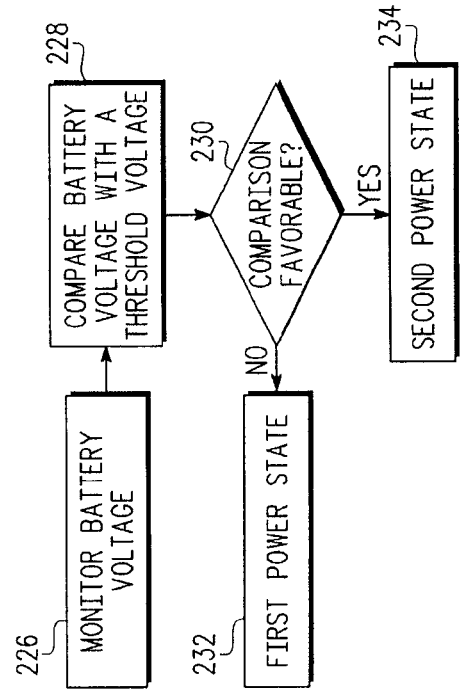
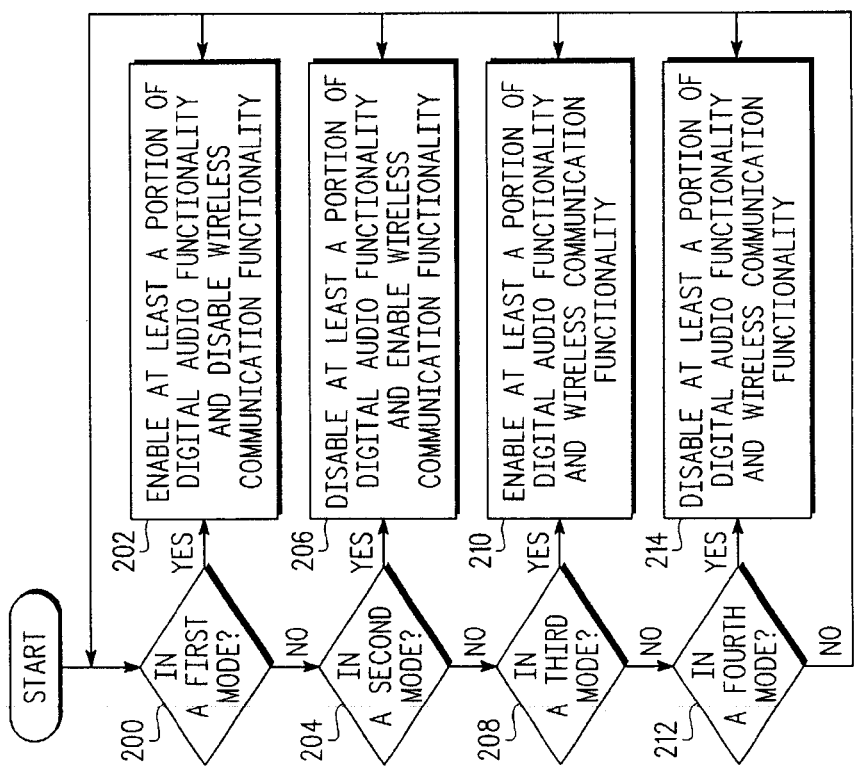
FIG. 10
FIG. 11
FIG. 9

MULTIPLE FUNCTION HANDHELD DEVICE

CROSS REFERENCE TO RELATED PATENTS

This patent application relates to co-pending patent application entitled LOW POWER MODE FOR A MULTIPLE FUNCTION HANDHELD DEVICE, U.S. patent application Ser. No. 11/290,052, filed on Nov. 30, 2005.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to handheld devices and more particularly to modes of a handheld device.

2. Description of Related Art

Integration of conventionally separate handheld devices into a single handheld device is current trend in the art. For instance, cellular telephones have been integrated with personal digital assistants (PDA), digital cameras, and walkie-talkie functionality. More recently, cellular telephones have been integrated with digital audio players (e.g., MP3 and/or WMA players). Such integration provides the user of a handheld device the convenience of carrying one device with the functionality of two or more devices.

While an integrated handheld device provides multiple functionalities, there are some instances and/or locations, where the user cannot or should not use one or more of the functionalities. For instance, current Federal Aviation Administration (FAA) regulations prohibit the use of cellular telephones on airplanes in transit, but allow the use of other handheld devices (e.g., PDA, digital audio player). In such instances, to comply with FAA regulations, a cellular telephone with additional integrated functions (e.g., PDA, digital audio player) must be powered down entirely while the airplane is in transit. Thus, the user is not able to use the approved functionality of the handheld device.

An ongoing design challenge with handheld devices is to reduce power consumption thereby increasing battery life (i.e., the duration for which a handheld device can operate properly without recharging or replacing its battery source). When the handheld device includes integration of multiple functionalities, reduction of power consumption is an even greater challenge.

Therefore, a need exists for a handheld device that provides greater flexibility of use and/or controlled power consumption.

BRIEF DESCRIPTION OF THE SEVERAL VIEWS OF THE DRAWING(S)

FIG. 9 is a logic diagram of a method for enabling portions of a multiple function handheld device in accordance with an embodiment of the present invention;

FIG. 10 is a logic diagram of a method for enabling portions of a multiple function handheld device based on power states in accordance with an embodiment of the present invention; and FIG. 11 is a logic diagram of a method for determining when a multiple function handheld device is in a first power state in accordance with an embodiment of the present invention.

DETAILED DESCRIPTION OF THE DRAWINGS

Figure 1:
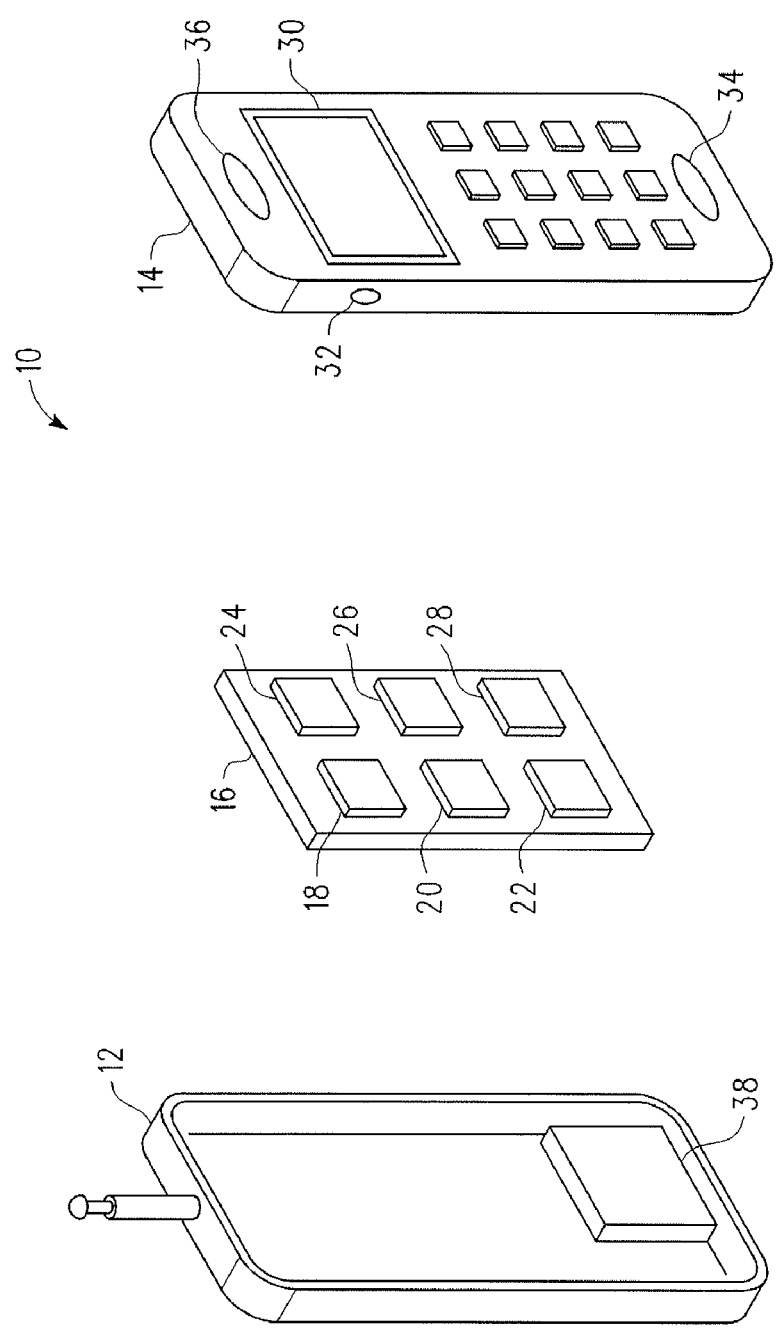
FIG. 1 is an exploded view of a cellular telephone with digital audio and/or video in accordance with the present invention.

FIG. 1 is an exploded diagram of a cellular telephone 10 with digital audio and/or video functional circuitry. As shown, the cellular telephone 10 includes a rear housing 12, a front housing 14, and a printed circuit board 16. The rear housing 12 may support a battery 38. The front housing 14 may include a display 30, a headphone jack 32, a microphone 34, a speaker 36 and an input control pad. The printed circuit board 16 may include one or more printed circuit boards that support a plurality of integrated circuits. Such integrated circuits may include a cellular phone radio frequency (RF) integrated circuit (IC) 18, a cellular telephone baseband (BB) integrated circuit 20, a digital audio integrated circuit 22, memory integrated circuits 24, 26 and may further include a digital video integrated circuit 28.

The cellular telephone 10, in a wireless communication mode of operation, may be used to support wireless communications such as cellular telephone communications, walkie-talkie communications, and/or dispatch communications. The cellular telephone 10 may alternatively operate in a digital audio mode to playback and/or record digital audio files. Such digital audio files may be in an MP3 format, WMA format and/or any other proprietary and/or standardized digital audio format. If the cellular telephone 10 includes video processing functionality (e.g., as may be performed by IC 28, or multiple ICs not shown), it may operate in a video mode to capture and/or play back still and/or motion video images. Such video images may be formatted in accordance with one or more video standards such as MPEG (motion picture expert group), JPEG (Joint Photographic Experts Group), etc.

The cellular telephone 10 may further include integrated circuits, and/or functionality within existing integrated circuits, to support a personal digital assistant (PDA) function. Such a personal digital assistant function allows task management, calendar management, contact list management, note management, et cetera. Accordingly, the cellular telephone 10 is a multiple function handheld device that enables a user to selectively utilize a variety of functional circuits (e.g., digital audio playback/record, digital video playback/record, PDA functions, and/or wireless communication functions).

Figure 2:
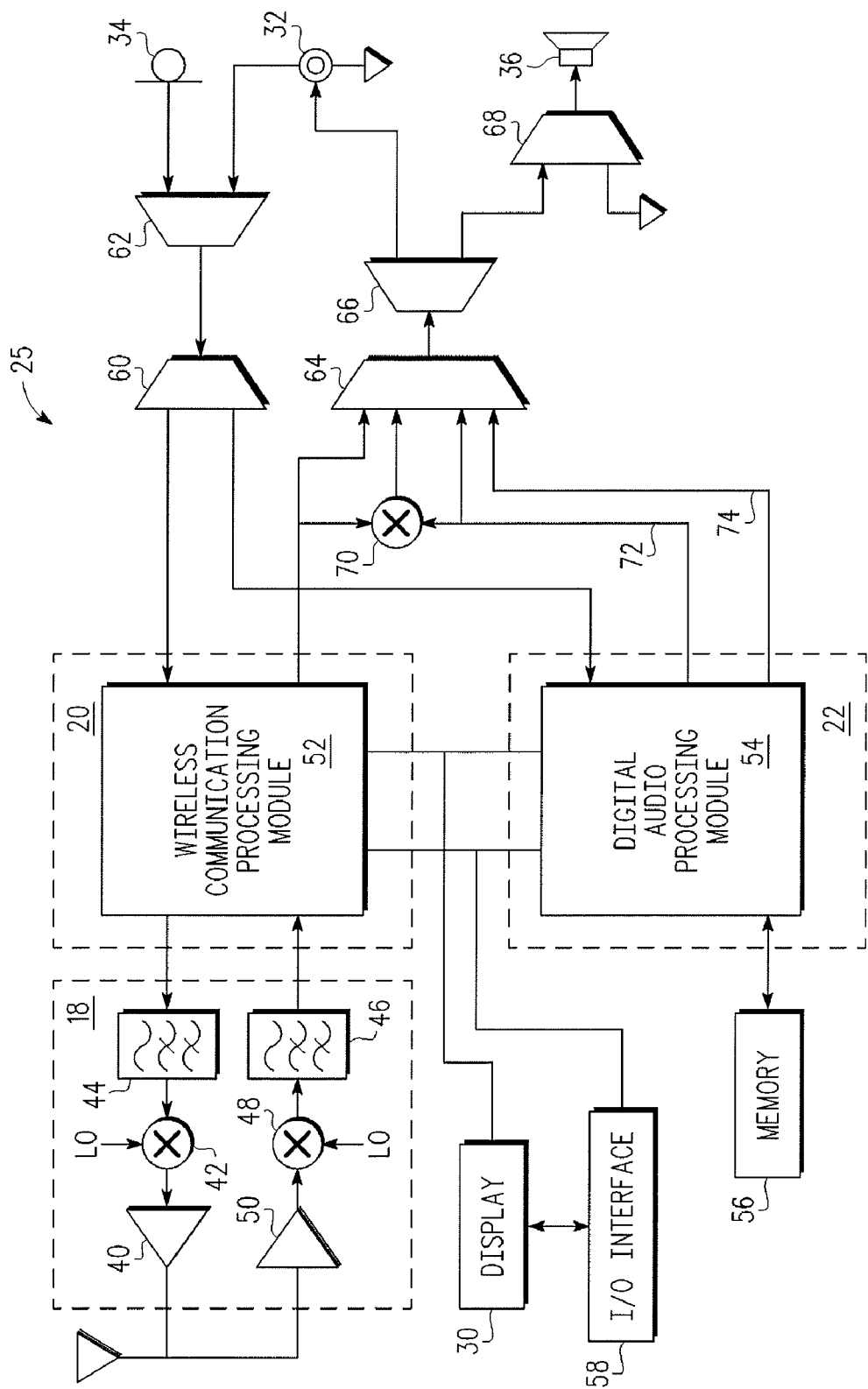
FIG. 2 is a schematic block diagram of a cellular telephone with digital audio in accordance with an embodiment of the present invention.

FIG. 2 is a schematic block diagram of the cellular telephone 25 that includes digital audio functionality. In this embodiment, the cellular telephone 25 includes the cellular telephone RF IC 18, the cellular telephone baseband IC 20, the digital audio IC 22, the display 30, an I/O interface 58, memory 56 (which may be included in one or more of integrated circuits 24 and 26), a plurality of multiplexers 60-68, a mixing module 70, the microphone 34, the headphone jack 32, and the speaker 36. The cellular telephone RF IC 18 may include a direct intermediate frequency (IF) conversion topology or a super heterodyne conversion technology. In general, the cellular telephone RF IC 18 includes a low noise amplifier (LNA) 50, a mixing module 48, and a low pass filter 46 for receiving RF signals, and includes a low pass filter 44, mixing module 42 and a power amplifier 40 for transmitting RF signals. The cellular telephone baseband IC 20 includes a wireless communication processing module 52. The digital audio IC 22 includes a digital audio processing module 54. In one embodiment, the digital audio processing IC may be an STMP 35xx and/or an STMP 36xx as produced and manufactured by SigmaTel, Inc.

The wireless communication processing module 52 and the digital audio processing module 54 may each be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Each processing module 53 and/or 54 may have associated therewith a memory element that may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 52 and/or 54 implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the processing module 52 and/54 executes, operational instructions corresponding to at least some of the steps and/or functions illustrated in FIGS. 1-11.

The cellular telephone 25 may be placed in a variety of different operating modes based on a mode selection. The mode selection may be received from the user via the I/O interface 58, which may be a USB (universal serial bus) interface, an infrared interface, a keyboard, I²C interface, et cetera. The particular mode selection may be processed by the wireless communication processing module 52 and/or the digital audio processing module 54. Alternatively, the cellular telephone 25 may receive an RF signal via the cellular telephone RF IC 18 indicating a particular mode of operation. For example, upon entering a hospital, an RF control signal may be broadcast in the lobby indicating that cellular telephone use is not allowed within the hospital. Upon receiving this RF control signal, the cellular telephone automatically disables the wireless communication functionality of the cellular telephone while leaving the digital audio processing functionality in the state of operation specified by the user (e.g., enabled or disabled). Accordingly, the user may enable or disable the digital audio functionality of the cellular telephone with the wireless communication functionality disabled. Such a feature is also beneficial for air travel, where many governmental agencies (e.g., Federal Aviation Agency—FAA) prohibit the use of cellular telephones on an airplane, but allow the use of CD players and MP3 players.

In addition to disabling the wireless communication function and enabling the digital audio processing functionality, the user may place the cellular telephone in a second mode where the digital audio functionality is disabled and the wireless communication functionality is enabled. Further, the user may place the cellular telephone in a third mode where both the wireless communication functionality and the digital audio processing functionality are enabled. Still further, the user may place the cellular telephone in a fourth mode where both the wireless communication processing functionality and the digital audio processing functionality are disabled. Such selective enabling and disabling of circuit functionalities of the cellular telephone allows the user to maintain certain functionalities while disabling others, which, in some instances, allows the user to comply with particular regulations of the environment in which the user is located (e.g., on an airplane) and/or to reduce power consumption by disabling functional circuitry that the user does not desire to use.

When the digital audio processing functionality is enabled, the digital audio processing module 54 may function in a playback mode where it retrieves stored digital audio files from memory 56 and produces therefrom a monophonic audio output 72 and/or a stereo audio output 74. The audio outputs 72 and 74 may be in an analog format or a digital format. If the wireless communication processing functionality is disabled, the cellular telephone will provide the stereo audio output 74 to the headphone jack 32 via multiplexer 64 and 66 when a headphone is plugged into headphone jack 32. If a headphone is not being used, multiplexers 64, 66 and 68 provide the monophonic audio output 72 (which may be produced by summing the left and right channels of the stereo audio output) to speaker 36. Note that when a headphone is plugged into headphone jack 32, multiplexer 68 provides a mute signal to speaker 36.

In a record mode, the digital audio processing module 54 receives an audio input via microphone 34 and multiplexers 62 and 60. The digital audio processing module 54 converts the audio signals into a digital audio file that may be stored in memory 56. In this mode, the digital audio processing module 54 is functioning as a digital voice recorder.

When the wireless communication processing functionality is enabled and the digital audio processing functionality is disabled, the wireless communication processing module 52 processes incoming communications via the LNA 50, mixing module 48 and low pass filter 46 of the cellular telephone RF IC 18 to produce analog signals. The analog signals are provided either to a headphone via the headphone jack 32 or to the speaker 36 via multiplexers 64, 66 and 68. For outgoing communications, analog signals are received via microphone 34 and multiplexers 62 and 60. The wireless communication processing module 52 converts the analog signals into baseband symbols, which are then converted into RF signals via the low pass filter 44, mixing module 42 and power amplifier 40.

In a mode when both the wireless communication processing functionality and digital audio processing functionality are enabled, the received wireless communication signals may be mixed via mixer 70 with the monophonic audio output 72 of the digital audio processing module 54. This allows for background music to be played while a wireless communication is active. In one embodiment, the monophonic audio output 72 may be scaled to a volume level such that it does not substantially interfere with the ongoing wireless communication.

Figure 3:
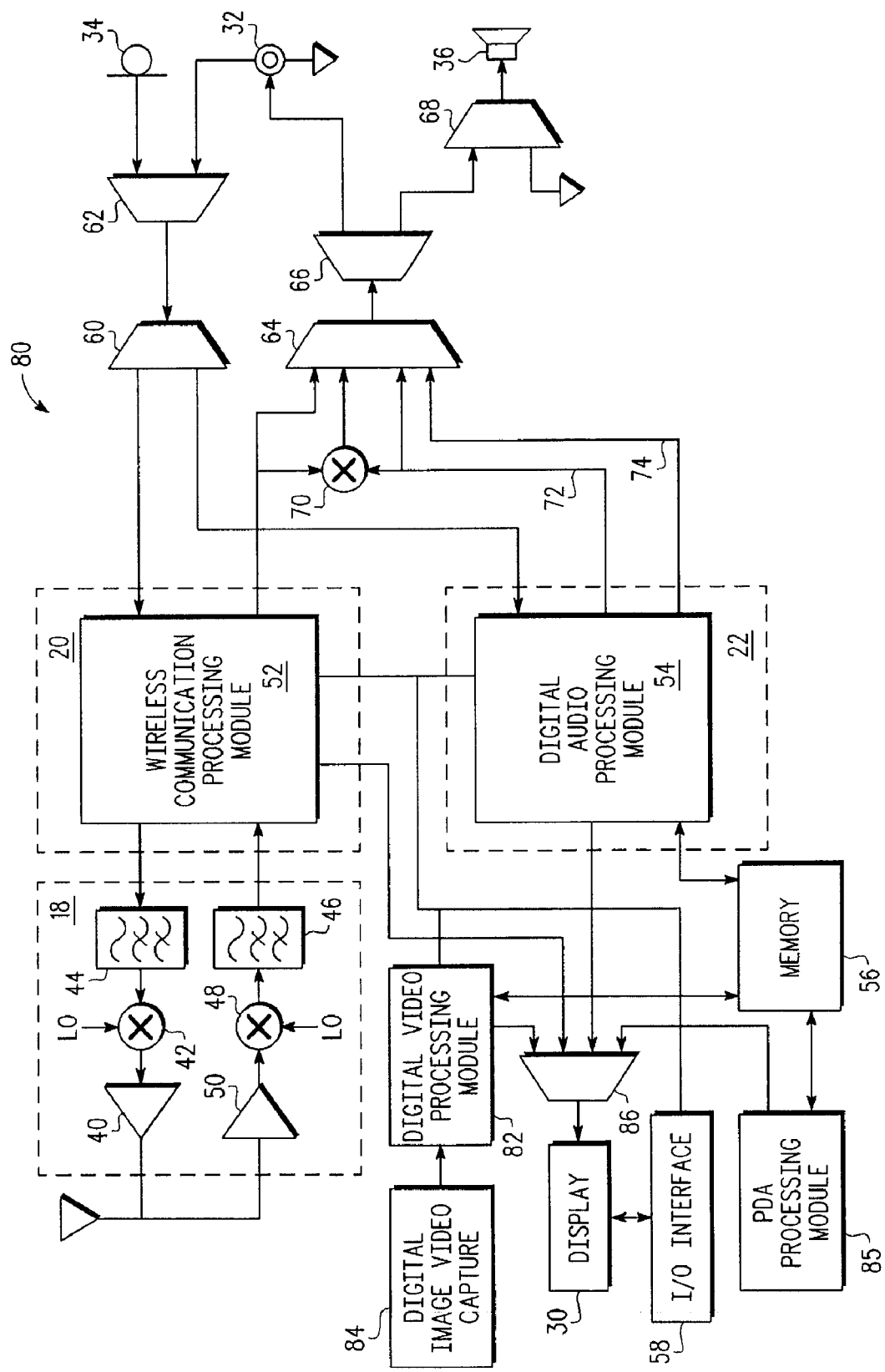
FIG. 3 is a schematic block diagram of a cellular telephone with a plurality of functional circuits in accordance with an embodiment of the present invention.

FIG. 3 is a schematic block diagram of a cellular telephone 80 that includes a plurality of functional circuits. The functional circuits include, but are not limited to, digital audio processing, digital video processing, digital video capture, and/or personal digital assistant (PDA) functionality. In this embodiment, the cellular telephone 80 includes the cellular telephone RF IC 18, the cellular telephone baseband IC 20, the digital audio IC 22, memory 56, a digital image video capture module 84, a digital video processing module 82, the display 30, the IO interface 58, a PDA processing module 85, multiplexers 60-68 and 86, the headphone jack 32, the microphone 34, and the speaker 36. As with the embodiment of FIG. 2, the wireless communication processing module 52 may support cellular telephone communications (e.g., one to one), walkie talkie communications (e.g., one to many), and/or dispatch communications (e.g., many to one). In addition, the digital audio processing module 54 may support digital audio playback, digital audio record, file transfer, digital audio encode and digital audio decode. The audio input and output via microphone 34 and headphone jack 32 or speaker 36 function as previously described with reference to FIG. 2.

The digital image video capture module 84 may be a digital recorder that captures still images and/or motion video images. The digital representation of the image and/or motion video is provided to the digital video processing module 82, which converts the received image and/or motion video into a corresponding digital video file, which may be formatted in accordance with MPEG, JPEG, a proprietary digital video image storage scheme and/or other standardized video digital image storage schemes. Accordingly, the digital video processing module 82 provides functionality for one or more of digital motion video playback, digital still image video playback, digital motion video record, digital still image record, digital video encoding, and/or digital video decoding.

The PDA processing module 85 enables the cellular telephone to provide the user with PDA functionality, which includes, but is not limited to, calendar management, task management, note management, and/or contact information management. The digital video processing module 82 and/or the PDA processing module 85 may be separate integrated circuits and/or combined with one or more of the wireless communication processing module 52 and the digital audio processing module 54.

Multiplexer 86 selects a video output to be provided to display 30. For example, in one mode, the multiplexer 86 may pass the video output from the digital video processing module 82 to display 30. The video output may be in an analog or digital format depending on the type of display and may include still images and/or motion video. Alternatively, the multiplexer 86 may provide an output from the wireless communication processing module 52 indicating information relevant to a wireless communication. As yet another alternative, the multiplexer 86 may output information regarding a digital audio file record and/or playback. As yet another option, multiplexer 86 may output a PDA signal that corresponds to a particular PDA function. In either mode, the IO interface 58 provides a corresponding input to one or more of the processing modules 52, 54, 82, and 85. In this embodiment, the cellular telephone 80 includes a plurality of functional circuits (e.g., wireless communication functionality, digital audio processing functionality, digital video processing functionality, digital image capturing, and PDA functionality). Accordingly, the user may actively select one or more of the circuit functionalities to be active at any given time, or the selection may be an automatic function of the cellular telephone, to comply with particular regulations of the environment in which the user is located (e.g., on an airplane), and/or to conserve power.

In another embodiment, the cellular telephone via one or more of the processing modules and/or a control module (not shown in FIG. 3, but is shown in subsequent figures) monitors the battery voltage of the cellular telephone. Based on the power level of the battery, the processing module and/or control module enables and/or disables circuit functionality in accordance with a priority enablement ordering. For example, when the battery is fully charged, or is a new battery, the priority enablement ordering may allow all of the functional circuits to be activate. As the battery power level decreases, indicating that the battery life is shortening, certain functional circuits are disabled. When the battery power level is near exhausted, the priority enablement ordering may only enable the wireless communication functionality such that the cellular telephone may receive and/or initiate a wireless communication.

The battery power level may be determined in a variety of ways. For example, the battery voltage may be compared with a plurality of voltage thresholds. When the battery voltage compares favorably to a highest threshold, an indication is provided indicating that the battery power level is fully charged and/or the battery is new. As the voltage level drops, the battery voltage will compare unfavorably to more and more thresholds until it reaches the lowest battery threshold indicating that the cellular telephone should be placed in a low battery mode thus, disabling all but the most critical function(s). In one embodiment, the most critical function may be the use of the cellular telephone for emergency calls. In another embodiment, however, the user may select the functions that are to be deemed critical and establish the ordering of which functions are disabled based on the decreasing battery power.

In one example embodiment, the priority enablement ordering may be wireless communication processing as the highest priority, followed by PDA functionality, followed by digital audio processing, followed by digital video processing. Accordingly, as the battery voltage drops, the digital video processing will be first disabled, then the digital audio processing, then the PDA functionality.

Figure 4:
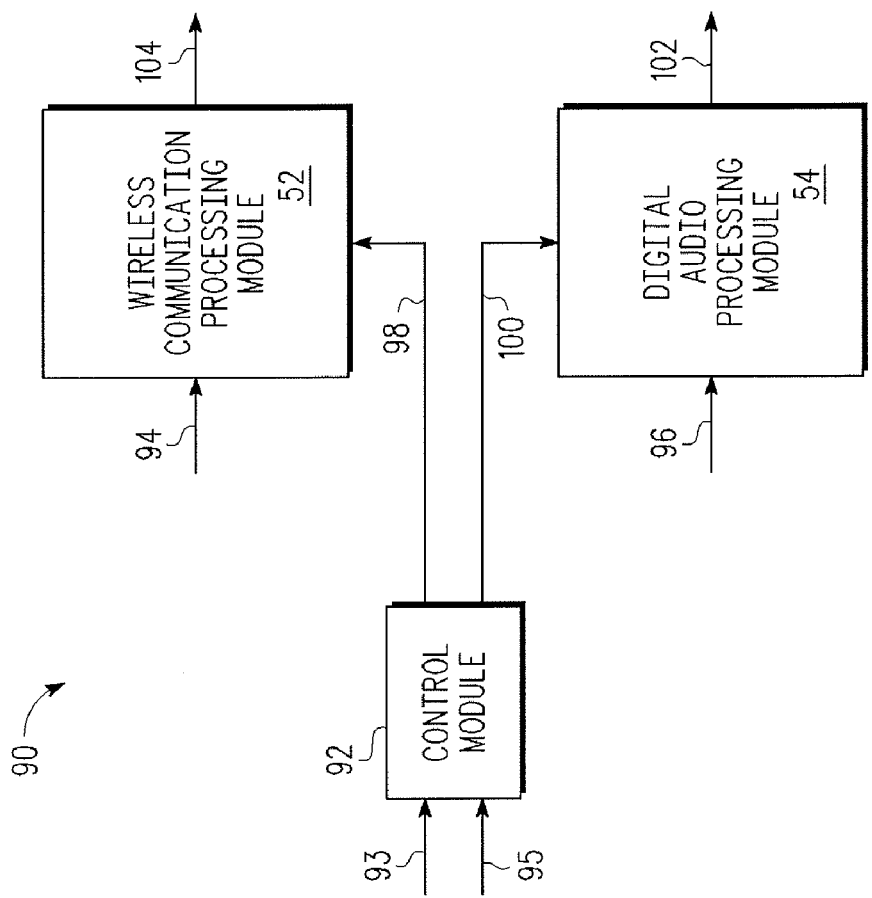
FIG. 4 is a schematic block diagram of a multiple function handheld device in accordance with an embodiment of the present invention.

FIG. 4 is a schematic block diagram of a multiple function handheld device 90 that includes the wireless communication processing module 52, the digital audio processing module 54, and a control module 92. The control module 92 may be included within one or more of processing modules 52 and 54 or it may be a separate processing module.

The control module 92 is operably coupled to receive a mode select signal 93 and/or a battery voltage 95. In one embodiment, the control module 92, based on the mode select signal 93, provides a signal 98 that enables or disables processing module 52 and/or a signal 100 that enables or disables processing module 54. For example, in a first mode, the control module may disable the wireless communication processing module 52 while enabling the digital audio processing module 54. While enabled, the digital audio processing module 54 converts digital audio files 96 into processed digital audio 102, which may be an analog audio output or a digital audio output. In such a mode, the multiple function handheld device 90 allows the user to be compliant with particular regulations of an environment (e.g., on an airplane where the use of cellular telephones is not permitted).

In another mode, the control module 92 may disable the audio processing module 54 and enable the wireless communication processing module 52. While enabled, the wireless communication processing module 52 processes wireless communications inbound and outbound 94 into processed voice communications 104. In another mode, the control module 92 may disable both processing modules 52 and 54. In yet another mode, the control module 92 may enable both processing modules 52 and 54.

The control module 92, while monitoring the battery voltage 95, may selectively enable or disable processing modules 52 and 54 based on the monitored battery voltage. In one embodiment, when the battery voltage 95 compares unfavorably to a threshold voltage, the control module 92 establishes a first power state. In the first power state, the control module 92 disables at least a portion of the audio processing functionality of the digital audio processing module 54 while enabling the wireless communication functionality of the wireless communication processing module 52. If the battery voltage 95 compares favorably to the threshold voltage, the control module 92 establishes a second power state. In the second power state, the control module enables both processing modules 52 and 54.

Figure 5:
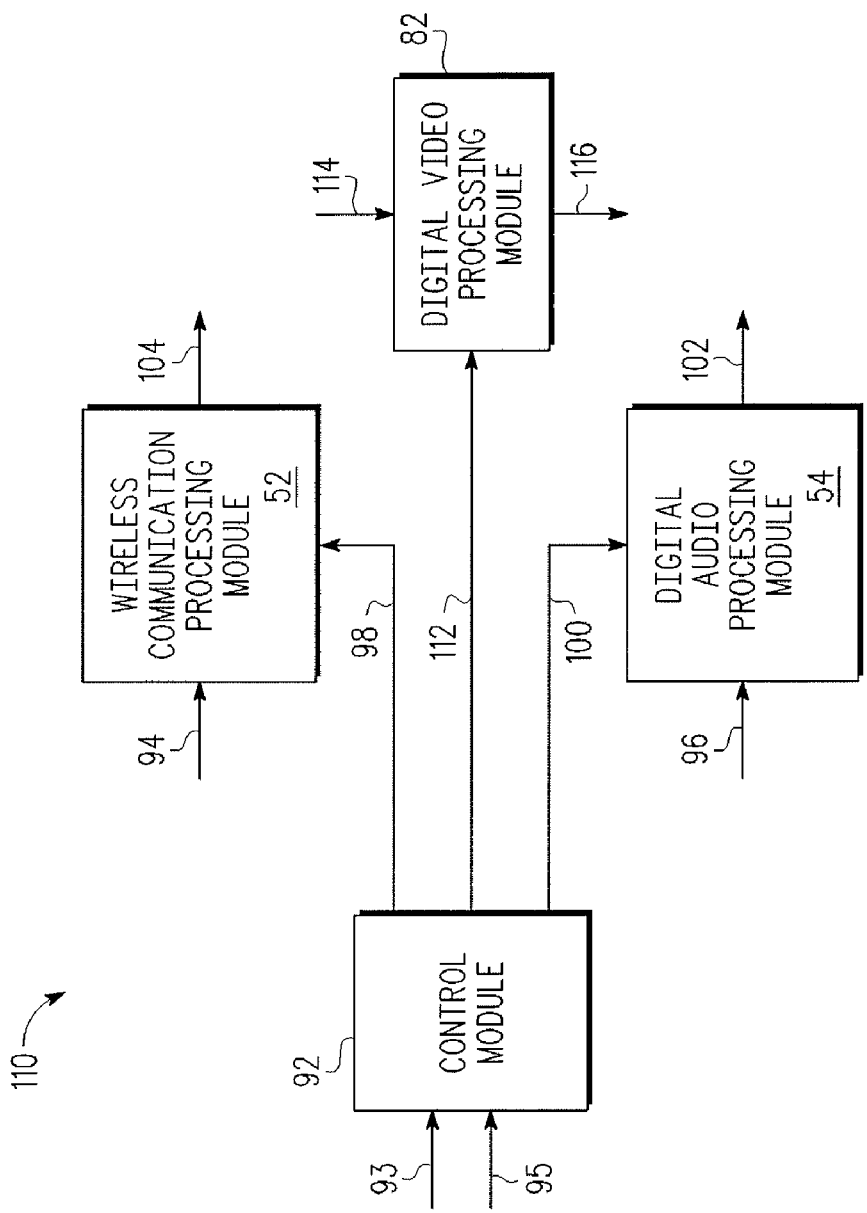
FIG. 5 is a schematic block diagram of another embodiment of a multiple function handheld device in accordance with the present invention.

FIG. 5 is a schematic block diagram of another embodiment of a multiple function handheld device 110. In this embodiment, the multiple function handheld device 110 includes the wireless communication processing module 52, the digital audio processing module 54, the digital video processing module 82, and the control module 92. In this embodiment, the control module 92 may activate one or more of the processing modules 52, 54 and 82 based on the mode select signal 93.

In addition, the control module 92 may activate one or more of the processing modules 52, 54 and 82 based on the battery voltage 95. For instance, when the battery voltage compares favorably to a first voltage threshold, the control module 92 may enable all three processing modules 52, 54 and 82. When the battery voltage drops below the first threshold but is above a second threshold, the control module may disable the video processing module 82, while enabling the digital audio processing module 54 and the wireless communication processing module 52. When the battery voltage 95 drops below a second threshold but is above a third threshold, the control module may enable the wireless communication processing module 52, but disable the digital video processing module 82 and the digital audio processing module 54. Note that when the digital video processing module 82 is enabled, it processes digital video 114 to produce processed digital video 116. The digital video may be stored MPEG files and/or stored JPEG which are rendered into an analog or digital video output for subsequent display.

Figure 6:
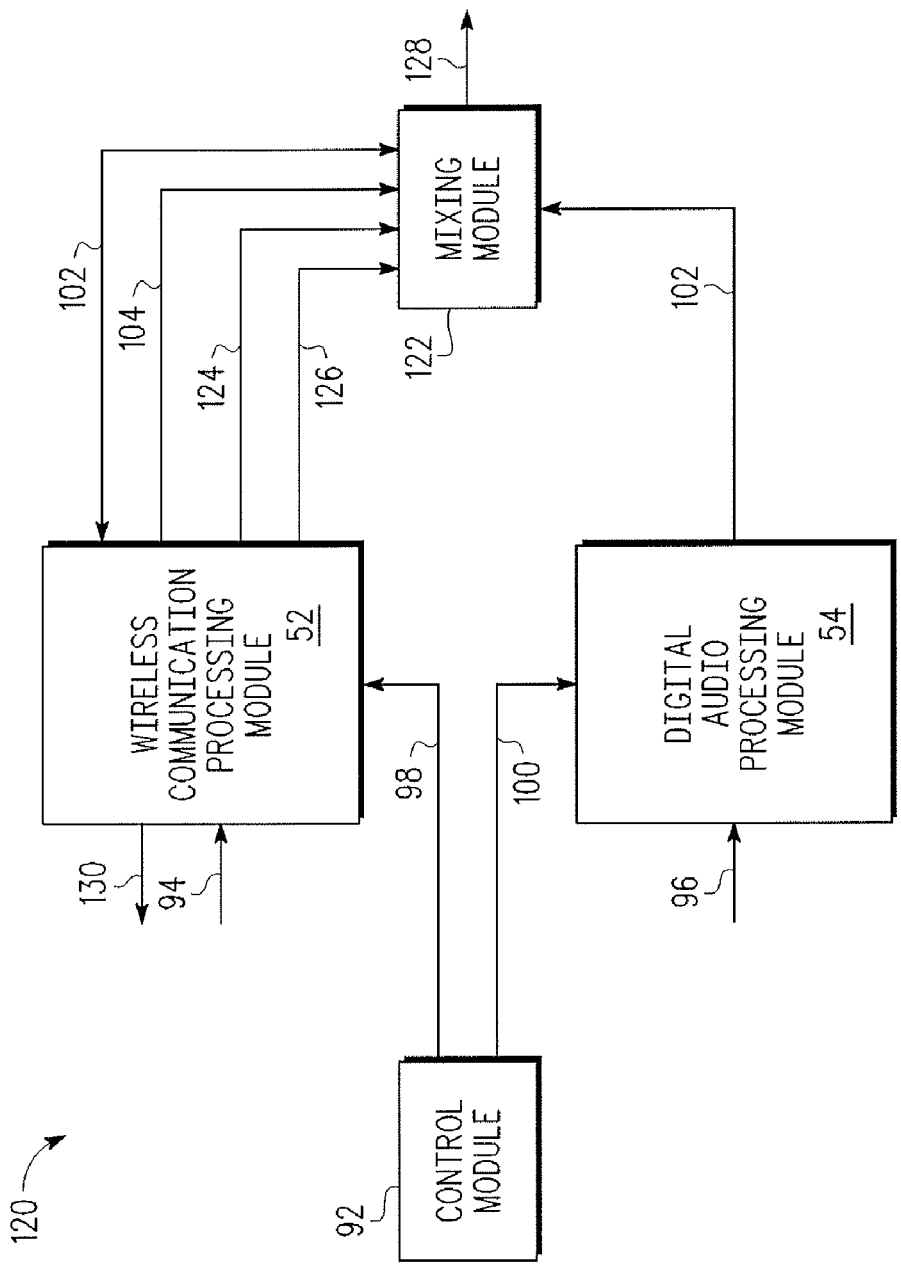
FIG. 6 is a schematic block diagram of yet another embodiment of a multiple function handheld device in accordance with the present invention.

FIG. 6 is a schematic block diagram of yet another embodiment of a multiple function handheld device 120. In this embodiment, the multiple function handheld device 120 includes the wireless communication processing module 52, the digital audio processing module 54, control module 92 and a mixing module 122. In this embodiment, the wireless communication processing module 52, while processing a wireless communication, may generate processed voice communications 104, a ring tone 124, an incoming call indication 126, and/or call-on-hold data 130. The call-on-hold data may correspond to playback of a digital audio file 96 for a call that is on hold.

In this embodiment, the mixing module 122 may mix the processed digital audio 102 with one or more of the processed voice communications 104, ring tone 124 and/or incoming call indication 126. The volume levels at which the signals are mixed to produce mixed signal 128 may be varied. In addition, the processed digital audio 102 may be faded out as an incoming call is indicated.

When the wireless communication processing module 52 is facilitating an active wireless communication and has placed another wireless communication on hold, the mixing module 102 may provide the processed voice communications 104 to the speaker and/or headphone jack while also providing the processed digital audio 102 to the wireless communication processing device 52. The wireless communication processing device 52 provides the processed digital audio 102 for the wireless communication on hold as the call-on-hold data 130. In this instance, while a third party is on hold, it is receiving playback of a digital audio file from the multiple function handheld device 120.

Figure 7:
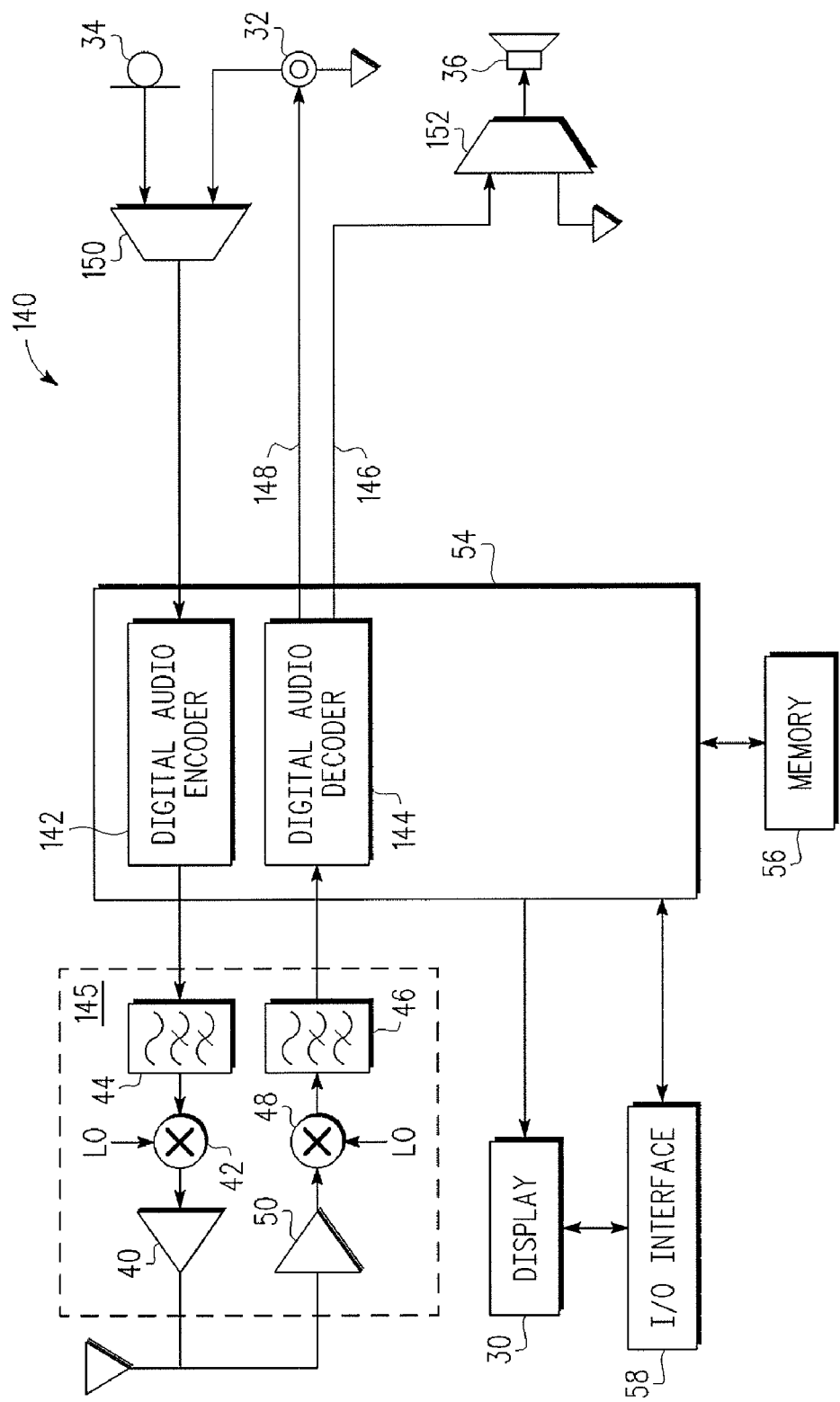
FIG. 7 is a schematic block diagram of a still further embodiment of a multiple function handheld device in accordance with the present invention.

FIG. 7 is a schematic block diagram of yet another embodiment of a multiple function handheld device 140. In this embodiment, the multiple function handheld device 140 includes an RF transceiver 145, the digital audio processing module 54, display 30, I/O interface 58, memory 56, microphone 34, headphone jack 32, speaker 36, and multiplexers 150 and 152. The digital audio processing module 54 includes a digital audio encoder 142 and a digital audio decoder 144. The RF transceiver 145 includes an RF transmit path which includes low pass filter 44, mixer 42 and power amplifier 40 and a receive path that includes low noise amplifier 50, mixer 48 and low pass filter 46.

In this embodiment, the digital audio processing module 54 may process digital audio files stored in memory 56 and/or may function as a digital voice recorder as previously described. In addition, the digital audio processing module 54 may further function to provide the baseband processing of incoming and outgoing wireless communications.

For wireless communications, the audio signals received via microphone 34 are provided to the digital audio encoder 142. The digital audio encoder 142 encodes the audio signals to produce outgoing baseband signals. The RF transceiver 145 converts the outgoing baseband signals into outgoing RF signals that are transmitted to a base station for relaying to another cellular telephone user, dispatch center, and/or other walkie talkie user. The RF transceiver 145 also receives inbound RF signals that are converted into inbound baseband signals. The digital audio decoder 144 converts the inbound baseband signals into a monophonic audio signal 146 (or stereo signal) that is subsequently provided to the speaker 36 or headphone jack 32.

In such an embodiment, the digital audio encoder 142 and digital audio decoder 144 may include a combination of wireless communication baseband processing and digital audio processing where common components are shared but function essentially separately. Alternatively, the digital audio encoding and digital audio decoding may be in accordance with a digital audio standard being supported by the multiple function handheld device wherein the baseband signals of the wireless communication function are at least partially encoded/decoded based on the digital audio standard. For example, the digital audio encoding 142 and digital audio decoding 144 may be done in accordance with a particular digital audio file format such as MP3, WMA, et cetera wherein the digital audio file format signals are converted into inbound and/or outbound baseband signals to support a wireless communication.

Figure 8:
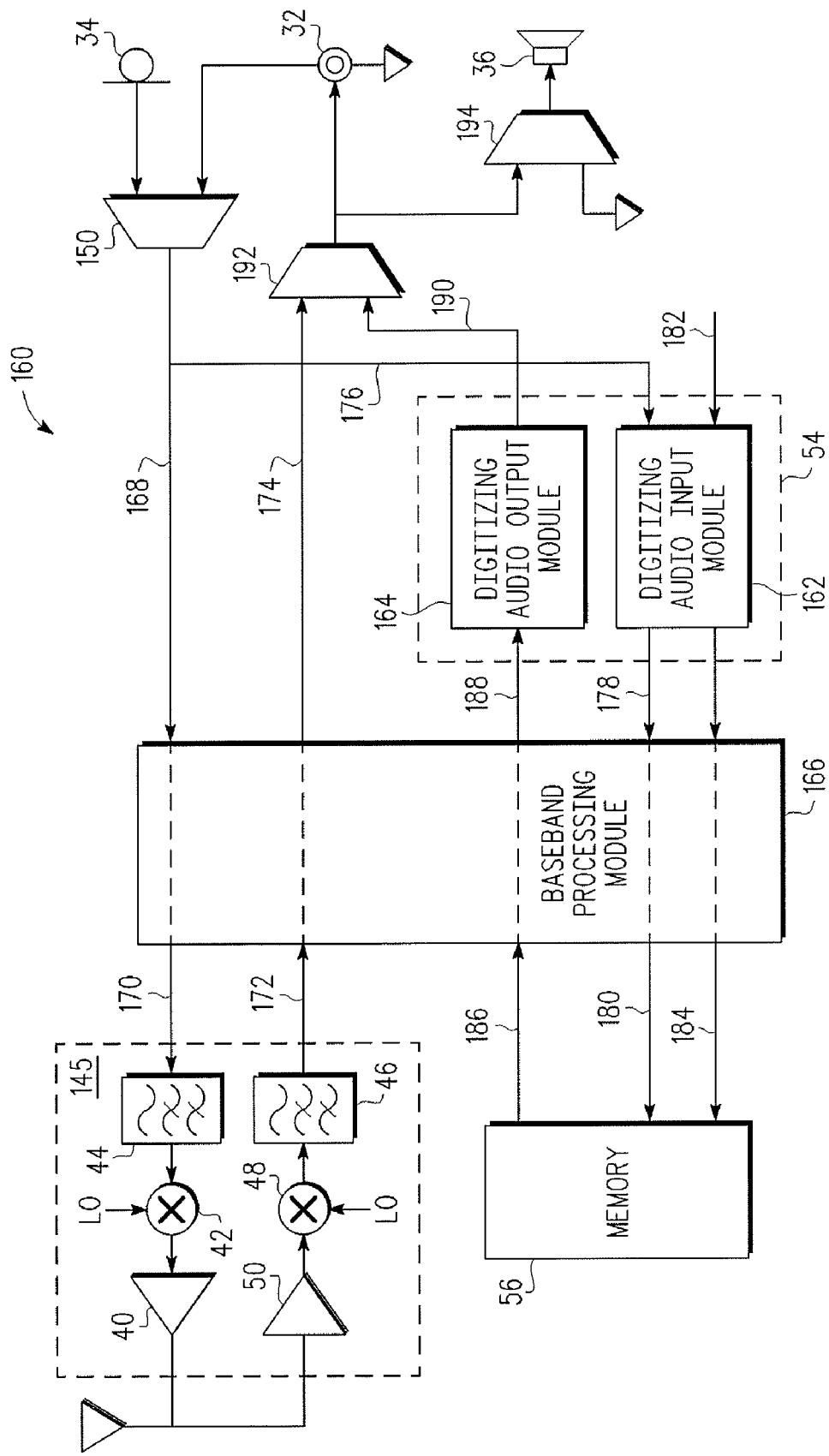
FIG. 8 is a schematic block diagram of yet another embodiment of a multiple function handheld device in accordance with the present invention.

FIG. 8 is a schematic block diagram of yet another embodiment of a multiple function handheld device 160. In this embodiment, the handheld device 160 includes the RF transceiver 145, a baseband processing module 166, memory 56, audio processing module 54, the microphone 34, headphone jack 32, speaker 36 and multiplexers 150, 192 and 194. In this embodiment, the baseband processing module 166 processes inbound baseband signals 172 and outbound baseband signals 170 in accordance with the wireless communication protocol or protocols being supported by the handheld device 130. Such a wireless communication protocol may be GSM, CDMA, et cetera.

The baseband processing module 166 functions to convert stored digital audio files 186, which are stored in a format corresponding to a wireless communication protocol, into outbound digitized audio signals 188. In this instance, the processing module 54 includes a digitizing audio output module 164 and digitizing audio input module 162. The digitizing audio output module 164 converts the outbound digitized audio signals 188 into analog output signals 190 which may be provided to the headphone jack 32 or speaker 36 via multiplexers 192 and 194. Alternatively, multiplexers 192 and 194 may provide the inbound communication data 174 from the baseband processing module 166 to headphone jack 32 or speaker 36.

The digitizing audio input module 162 may provide audio signals 176, via microphone 34, as digitized audio signals 178 to the baseband processing module 166. The baseband processing module 166 converts the digitized audio signals 178 into a digital audio file 180 that may be stored in memory 56. Additionally, the digitizing audio input module 162 may pass inbound digitized audio signals 182 to the baseband processing module 166. The baseband processing module 166 converts the inbound digitized audio signals 182 into a second digital audio file 184, which may be stored in memory 56. The conversion of digitized audio signals 178 and/or 182 into digital audio files 180 or 184 may be done in accordance with the encoding performed by the baseband processing module 166 that it utilizes to encode outbound communication data 168 into outbound baseband signals 170.

FIG. 9 is a logic diagram of a method for enabling functional circuits of a multiple function handheld device. The process begins at Step 200 where a determination is made as to whether the handheld device is in a first mode. If so, the process proceeds to Step 202 where at least a portion of the digital audio functionality is enabled and the wireless communication functionality is disabled. In one embodiment, the digital audio functionality includes at least one of digital audio playback, digital audio record, file transfer, digital audio encode and digital audio decode. In an embodiment, the wireless communication functionality includes at least one of cellular telephone communication processing, walkie talkie communication processing and dispatch communication processing. In another embodiment, the handheld device may include digital video functionality that may be enabled when the device is in the first mode. In one embodiment, the digital video functionality includes at least one of digital motion video playback, digital still image video playback, digital motion video record, digital still image record, digital video encode and digital video decode.

The handheld device may be placed in the first mode by detecting selection of the first mode by interpreting a menu selection, interpreting a button activation via the keyboard, and/or interpreting proximity based wireless communication information. For example, the proximity based wireless communication information may be a wireless communication indicating that the handheld device should be placed in the first mode.

If the device is not in the first mode, the process proceeds to Step 204 to determine whether it is in a second mode. If so, the at least a portion of the digital audio functionality is disabled while the wireless communication functionality is enabled in Step 206.

If the device is not in the second mode, a determination is made in Step 208 as to whether it is in a third mode. If the device is in a third mode, the digital audio functionality and wireless communication functionality are enabled in Step 210.

If the device is not in the third mode, a determination is made in Step 212 as to whether it is in a fourth mode. If the device is in a fourth mode, the process proceeds to Step 214 where the digital audio functionality and wireless communication functionality are disabled.

FIG. 10 is a logic diagram of a method for power conservation of a multiple function handheld device. The process begins at Step 220 where a determination is made as to whether the device is in a first power state. The determination of the first power state will be described in greater detail with reference to the logic diagram of FIG. 11. When the device is in a first power state, the process proceeds to Step 222 where at least a portion of the digital audio functionality is disabled and the wireless communication functionality is enabled.

If the device is not in the first power state, the process proceeds to Step 224 where, in a second power state, the digital audio functionality and wireless communication functionality are enabled.

FIG. 11 is a logic diagram for determining whether the handheld device is in a first power state. The process begins at Step 226 where a battery voltage is monitored. The process then proceeds to Step 228 where the battery voltage is compared with a threshold voltage. The process then proceeds to Step 230 where a determination is made as to whether the comparison of Step 228 is favorable. If not, the process proceeds to Step 232 where an indication that the device is in the first power state is made. If the comparison is favorable, the process proceeds to Step 234 where an indication that the device is in the second power state is made.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a variety of methods and apparatus for enabling and/or power conservation of multiple functions of a multiple function handheld device. As one of ordinary skill in the art will appreciate, other embodiments of the present invention may be derived from the teachings contained herein without deviating from the scope of the claims.

What is claimed is:

1. A method performed by a multiple function handheld device that includes a wireless communication processing module, a digital audio processing module, and a control module, wherein the method comprises:
   receiving a radio frequency (RF) control signal; and
   in response to receiving the RF control signal, the control module causing the multiple function handheld device to operate in a first mode by:
      the control module leaving at least a portion of a digital audio functionality that is provided by the digital audio processing module in a state of operation specified by a user, wherein the state of operation may be enabled or disabled, and
      the control module disabling the wireless communication module from providing a wireless communication functionality, wherein the wireless communication functionality includes processing incoming communications;
   wherein the control module also causes the multiple function handheld device to operate in a second mode by disabling the digital audio functionality and enabling the wireless communication functionality;
   wherein the control module also causes the multiple function handheld device to operate in a third mode by enabling the digital audio functionality and the wireless communication functionality, wherein, in the third mode, the digital audio processing module is operably coupled to process digital audio to produce processed digital audio, and the wireless communication processing module is operably coupled to process wireless communications to produce processed voice communication, and wherein the processed digital audio is mixed with the processed voice communication to produce a mixed digital audio signal; and
   wherein the control module also causes the multiple function handheld device to operate in a fourth mode by disabling the digital audio functionality and the wireless communication functionality.

2. The method of claim 1, wherein the at least a portion of the digital audio functionality comprises at least one of:
   digital audio playback;
   digital audio record;
   file transfer;
   digital audio encode; and
   digital audio decode.

3. The method of claim 1, wherein the wireless communication functionality comprises at least one of:
   cellular telephone communication processing;
   walkie-talkie communication processing; and
   dispatch communication processing.

4. The method of claim 1 further comprises:
   detecting a first mode selection by a user of the multiple function handheld device;
   in response to detecting the first mode selection, causing the multiple function handheld device to operate in the first mode;
   detecting a second mode selection by the user;
   in response to detecting the second mode selection, causing the multiple function handheld device to operate in the second mode by:
      disabling the at least a portion of the digital audio functionality; and
      enabling the wireless communication functionality.

5. The method of claim 4 further comprises:
   enabling the at least a portion of the digital audio functionality and the wireless communication functionality in response to a third mode selection; and
   disabling the at least a portion of the digital audio functionality and the wireless communication functionality in response to a fourth mode selection.

6. The method of claim 1 further comprises:
   detecting selection of the first mode by at least one of:
      interpreting a menu selection;
      interpreting a button activation; and
      interpreting proximity based wireless communication information.

7. The method of claim 1, wherein causing the multiple function handheld device to operate in the first mode further comprises:
   enabling at least a portion of a digital video functionality.

8. The method of claim 7, wherein the at least a portion of the digital video functionality comprises at least one of:
   digital motion video playback;
   digital still image video playback;
   digital motion video record;
   digital still image record;
   digital video encode; and
   digital video decode.

9. A multiple function handheld device comprises:
   a digital audio processing module operably coupled to process digital audio when enabled, the digital audio processing module including:
      a digital audio encoder, and
      a digital audio decoder;
   a wireless communication processing module operably coupled to process a wireless communication when enabled, the wireless communication processing module including:
      a radio transceiver operably coupled to convert inbound radio frequency (RF) signals into inbound baseband signals and to convert outbound baseband signals into outbound RF signals, wherein the digital audio encoder converts outbound communication data into the outbound baseband signals and the digital audio decoder converts the inbound baseband signals into inbound communication data; and
   a control module operably coupled to:
      enable the digital audio processing module and disable the wireless communication processing module in a first mode;
      disable the digital audio processing module and enable the wireless communication processing module in a second mode;
      enable the digital audio processing module and the wireless communication processing module in a third mode; and
      disable the digital audio processing module and the wireless communication processing module in a fourth mode,
      wherein, in the third mode,
      the digital audio processing module is operably coupled to process the digital audio to produce processed digital audio, and the wireless communication processing module is operably coupled to process the wireless communication to produce processed voice communication,
wherein the processed digital audio is mixed with the processed voice communication to produce a mixed digital audio signal.

10. The multiple function handheld device of claim 9 further comprises:
the digital audio processing module operably coupled to process the digital audio to produce the processed digital audio; and
the wireless communication processing module operably coupled to process the wireless communication to produce a ring tone in response to detecting an incoming call; wherein the processed digital audio is mixed with the ring tone to produce a mixed digital audio signal.

11. The multiple function handheld device of claim 9 further comprises:
the digital audio processing module operably coupled to process the digital audio to produce the processed digital audio; and
the wireless communication processing module operably coupled to process the wireless communication to produce processed voice communication for an active call and facilitate providing the processed digital audio for a call on hold.

12. The multiple function handheld device of claim 9 further comprises:
the digital audio processing module operably coupled to process the digital audio to produce the processed digital audio in a fade out mode in response to an incoming call indication; and
the wireless communication processing module operably coupled to process the wireless communication to:
detect an incoming call;
generate the incoming call indication; and
produce processed voice communication for the incoming call.

13. A multiple function handheld device comprises:
a digital audio processing module operably coupled to process digital audio when enabled, the digital audio processing module including:
a digital audio encoder;
a digital audio decoder;
a digitizing audio input module operably coupled to digitize an audio signal to produce a digitized audio signal and to receive inbound digitized audio signals; and
a digitizing audio output module operably coupled to convert outbound digitized audio signals into analog audio signals;
a wireless communication processing module operably coupled to process a wireless communication when enabled, the wireless communication processing module including:
a radio transceiver operably coupled to convert inbound radio frequency (RF) signals into inbound baseband signals and to convert outbound baseband signals into outbound RF signals, wherein the digital audio encoder converts outbound communication data into the outbound baseband signals and the digital audio decoder converts the inbound baseband signals into inbound communication data;
a baseband processing module operably coupled to:
convert the inbound baseband signals into inbound communication data;
convert outbound communication data into the outbound baseband signals;
convert the digitized audio signal into a first digital audio file;
convert the inbound digitized audio signals into a second digital audio file; and
convert a stored digital audio file into the outbound digitized audio signals; and
a control module operably coupled to:
enable the digital audio processing module and disable the wireless communication processing module in a first mode;
disable the digital audio processing module and enable the wireless communication processing module in a second mode;
enable the digital audio processing module and the wireless communication processing module in a third mode; and
disable the digital audio processing module and the wireless communication processing module in a fourth mode.

14. A method performed by a multiple function handheld device that includes a wireless communication module and a control module, wherein the method comprises:
receiving a radio frequency (RF) control signal; and
in response to receiving the RF control signal, the control module causing the multiple function handheld device to operate in a first mode by the control module disabling the wireless communication module from providing a wireless communication functionality, wherein the wireless communication functionality includes processing incoming communications,
wherein the control module also causes the multiple function handheld device to operate in a second mode by disabling the digital audio functionality and enabling the wireless communication functionality;
wherein the control module also causes the multiple function handheld device to operate in a third mode by enabling the digital audio functionality and the wireless communication functionality, wherein, in the third mode, the digital audio processing module is operably coupled to process digital audio to produce processed digital audio, and the wireless communication processing module is operably coupled to process wireless communications to produce processed voice communication, and wherein the processed digital audio is mixed with the processed voice communication to produce a mixed digital audio signal; and
wherein the control module also causes the multiple function handheld device to operate in a fourth mode by disabling the digital audio functionality and the wireless communication functionality.

15. The method of claim 14, further comprising, in response to receiving the RF control signal:
enabling at least a portion of a digital audio functionality.

16. The method of claim 14, further comprising, in response to receiving the RF control signal:
leaving at least a portion of a digital audio functionality in a previously-specified state of operation.

17. The method of claim 16, wherein the at least a portion of the digital audio functionality comprises at least one of:
digital audio playback;
digital audio record;
file transfer;
digital audio encode; and
digital audio decode.

18. The method of claim 16, wherein causing the multiple function handheld device to operate in the first mode further comprises:

enabling at least a portion of a digital video functionality.

19. The method of claim 16, wherein causing the multiple function handheld device to operate in the first mode further comprises:

leaving at least a portion of a digital video functionality in a previously-specified state of operation.

20. The method of claim 19, wherein the at least a portion of the digital video functionality comprises at least one of:

digital motion video playback;
digital still image video playback;
digital motion video record;
digital still image record;
digital video encode; and
digital video decode.

* * * * *

UNITED STATES PATENT AND TRADEMARK OFFICE
CERTIFICATE OF CORRECTION

| | | |
|---|---|---|
| PATENT NO. | : 7,640,041 B2 | Page 1 of 1 |
| APPLICATION NO. | : 11/290329 | |
| DATED | : December 29, 2009 | |
| INVENTOR(S) | : Thomas Glen Ragan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 982 days.

Signed and Sealed this

Ninth Day of November, 2010

David J. Kappos
*Director of the United States Patent and Trademark Office*